United States Patent
Maas, III (10) Patent No.: US 6,181,832 B1
(45) Date of Patent: Jan. 30, 2001

(54) METHODS AND SYSTEMS FOR REMOVING ARTIFACTS INTRODUCED BY IMAGE REGISTRATION

(75) Inventor: Luis C. Maas, III, Brookline, MA (US)

(73) Assignee: McLean Hospital Corporation, Belmont, MA (US)

(*) Notice: Under 35 U.S.C. 154(b), the term of this patent shall be extended for 0 days.

(21) Appl. No.: 09/062,396

(22) Filed: Apr. 17, 1998

(51) Int. Cl.[7] ....................................... G06K 9/32
(52) U.S. Cl. ............................. 382/294; 382/275
(58) Field of Search ................................. 382/294, 275, 382/268, 267, 278, 130, 131, 132; 324/309

(56) References Cited

U.S. PATENT DOCUMENTS

| | | | |
|---|---|---|---|
| 4,616,180 | 10/1986 | Compton | 324/309 |
| 4,730,620 | 3/1988 | Bailes | 128/653 |
| 4,761,613 | 8/1988 | Hinks | 324/309 |
| 4,937,526 | 6/1990 | Ehman et al. | 324/309 |
| 4,968,935 | 11/1990 | Ehman et al. | 324/309 |
| 5,005,573 | 4/1991 | Greer et al. | 128/653 |
| 5,035,244 | 7/1991 | Stokar | 128/653 |
| 5,113,137 | 5/1992 | Koizumi et al. | 324/307 |
| 5,115,812 | 5/1992 | Sano et al. | 128/653.2 |
| 5,243,284 | 9/1993 | Noll | 324/309 |
| 5,251,128 | 10/1993 | Crawford | 364/413.19 |
| 5,287,276 | 2/1994 | Crawford et al. | 364/413.19 |
| 5,323,110 * | 6/1994 | Fielden et al. | 324/309 |
| 5,412,322 | 5/1995 | Wollin | 324/318 |
| 5,453,840 * | 9/1995 | Parker et al. | 356/400 |
| 5,495,540 | 2/1996 | Frankot et al. | 382/294 |
| 5,531,520 * | 7/1996 | Grimson et al. | 382/131 |
| 5,602,476 | 2/1997 | Liu et al. | 324/309 |
| 5,611,000 | 3/1997 | Szeliski et al. | 382/294 |
| 5,623,560 | 4/1997 | Nakajima et al. | 382/295 |

OTHER PUBLICATIONS

Apicella, et al., "Fast multi–modality image matching," *SPIE vol. 1092 Medical Imaging III: Image Processing* (1989), 252–263.

(List continued on next page.)

* cited by examiner

Primary Examiner—Yon J. Couso
(74) Attorney, Agent, or Firm—Fish & Richardson P.C.

(57) ABSTRACT

The invention features a method for determining a set of post-registration correction terms that correct for artifacts introduced by an algorithm used to register images represented by values at an array of points, the method including: providing a series of images of a reference object; registering the images with each other using the algorithm to produce a series of registered images; and determining the set of post-registration correction terms based on variations among the registered values of the registered images at selected points.

The invention also features a method for correcting artifacts introduced into images registered by an algorithm that repositions unregistered images along a selected coordinate, wherein the algorithm repositions each of the unregistered images along the selected coordinate by a repositioning value, the method including: comparing a variation among the image values of the registered images at a selected region of the array with a variation expressed by a superposition of at least one post-registration correction terms, wherein one of the post-registration correction terms is a vector equal to the values of a polynomial in the selected coordinate at each of the repositioning values, and wherein the polynomial is a second or higher order polynomial.

An image processing system can perform the methods and a computer program stored on a computer readable medium can include instructions that cause a computer to perform the methods.

38 Claims, 5 Drawing Sheets

OTHER PUBLICATIONS

Cesmeli, et al., An Automated Temporal Alignment Technique for the Translational and Rotational Correction of Digital . . . . , *IEEE*, 619–621 (1993).

Cideciyan, et al., "Registration of high resulution images of the retina," *SPIE vol. 1652, Medical Imaging VI: Image Processing*, 310–322 (1992).

Friston et al., "Movement–Related Effects in fMRI Time–Series", *MRM*, 35:346–355, 1996.

Fu, et al., "Orbital Navigator Echoes for Motion Measurements in Magnetic Resonance Imaging," *Orbital Navigator Echoes*, 34:746–753 (1995).

Hajnal et al., "Artifacts Due to Stimulus Correlated Motion in Functional Imaging of the Brain", *MRM*, 31:283–291, 1994.

Jackson, et al., "Selection of a Convolution Function of Fourier Inversion Using Gridding," *IEEE*, 10:473–478, (1991).

Maas et al., "Decoupled Automated Rotational and Translational Registration for Functional MRI Time Series Data: The DART Registration Algorithm", *MRM*, 37:131–139, 1997.

Maas et al., "Regional Cerebral Blood Volume Measured by Dynamic Susceptibility Contrast MR Imaging in Alzheimer's Disease: A Principal Components Analysis", *JMRI*, 7:215–219, 1997.

Mosquera, et al., Noise Behavior in Gridding Reconstruction, *IEEE*, 2281–2284 (1995).

Pelizzari, et al., "Accurate Three–Dimensional Registration of CT, PET, and/or MR Images of the Brain," *Journal of Computer Assisted Tomography*, 13:20–26 (1989).

Pratt, et al, "Correlation Techniques of Image Registration," *IEEE Transactions on Aerospace and Electronic Systems*, AES–10:353–358, (1974).

Woods, et al., "Rapid Automated Algorithm for Aligning and Reslicing PET Images," *Journal of Computer Assisted Tomography*, 16:620–633 (1992).

Zeffiro, "Clinical Functional Image Analysis: Artifact Detection and Reduction", *Neuroimage*, 4:s95–s100, 1996.

METHODS AND SYSTEMS FOR REMOVING ARTIFACTS INTRODUCED BY IMAGE REGISTRATION

FIELD OF THE INVENTION

The invention relates to electronic imaging and image registration, and more particularly, to the reduction of noise introduced by post-processing of electronic images.

BACKGROUND OF THE INVENTION

Images such as photographs, x-rays, and maps contain an abundance of information. Often such images are recorded as electronic images to allow digital storage and indexing, rapid access, and post-processing including constructing a composite image from multiple existing images, filtering existing images, and removing noise from existing or constructed images.

Magnetic resonance imaging (MRI) is a widely-used diagnostic technique in which radio frequency (RF) signals are analyzed to produce diagnostic information and stored as electronic images. Echo-planar imaging (EPI) is a subset of MRI that provides high temporal resolution achieved with faster imaging techniques, and typically results in large image data sets. One application of EPI is functional magnetic resonance imaging (fMRI), where a time series of images are acquired for a selected plane (or planes) of a subject. In challenge-based fMRI of the human brain, a time series of images of one or more planes within a subject's brain are collected while the subject is exposed to a sequence of stimulus conditions, to identify functional changes in brain characteristics.

The high spatial resolution of EPI makes challenge-based experiments sensitive to subject movements on the scale of millimeters or less. Stimulus-correlated movements of the subject may lead to false results. The false information introduced by a movement by the subject is commonly referred to as a motion artifact. To accurately analyze the time series of images, motion artifacts must be removed by registering the series of images. Proper interframe registration of the time series of images to remove motion artifacts is particularly important in studies in that the subject's motion is an integral part of the experiment, such as experiments which require spoken responses or the performance of motor tasks. See, for example, J. V. Hajnal et al., *Magn. Reson. Med.*, 31:283–291, 1994.

Techniques used to register image sets include the use of physical immobilization devices to maintain the subject in a known position and the placement of external fiduciary markers as landmarks for subsequent alignment. There are also numerous registration algorithms that construct "registered" images by repositioning each of the "misregistered" images by linear interpolation or Fourier regridding. See, for example, L. C. Maas et al., *Magn. Reson. Med.*, 37:131–139, 1997, and A. Apicella et al., *SPIE Medical Imaging III: Image Processing*, 1092:252–263, 1989.

However, such registration algorithms can introduce additional artifacts into the image set that corrupt fMRI analysis.

SUMMARY OF THE INVENTION

The invention features methods and systems for using and determining post-registration correction terms to remove resampling artifacts from a series of registered images. The invention is based on the discovery that the artifacts introduced into a series of registered images by a registration algorithm generate variances at multiple locations of the images, e.g., at each point of the images, that can be modelled by an incomplete set of basis functions, which are referred to as post-registration correction terms. For example, post-registration terms including at least one non-linear polynomial, e.g., the first six Legendre polynomials, are useful for modelling resampling artifacts produced by rotational registration. The rotational angles used by the rotational registration are used as the arguments in the polynomial post-registration correction terms.

To remove resampling artifacts from registered images, a processing system determines the variance between the series of registered images, at each of multiple locations, that can be expressed in terms of a superposition of the post-registration correction terms, e.g., by a multiple linear regression. The processing system then removes that variance from the series of registered images at each of the multiple locations.

In general, in one aspect, the invention features a method for determining a set of post-registration correction terms that correct for artifacts introduced by an algorithm used to register images represented by values at a first array of points. The method includes: providing a series of images of a reference object, wherein each image in the series corresponds to a particular orientation of the reference object; registering the images with each other using the algorithm to produce a series of registered images in which the reference object in each of the registered images is in a common orientation, wherein each of the registered images is represented by registered values at a second array of points; and determining the set of post-registration correction terms based on variations among the registered values of the registered images at selected points of the second array.

The method can include any of the following features. Each post-registration correction term can be a vector having a factor for each of the particular orientations of the reference object. Alternatively, each of the post-registration terms can be a function that depends on a coordinate corresponding to the particular orientations of the reference object. The first and second arrays can be two-dimensional or three-dimensional. The particular orientations of the reference object can be along a rotational coordinate or a translational coordinate. The first and second arrays can be identical to one another. The method can determine the set of post-registration correction terms from principle component analysis of the variations among the registered values of the registered images at the selected points of the second array.

In another aspect, the invention features a method for correcting artifacts introduced by registering images with an algorithm, wherein the registered images are represented by values at an array of points. The method includes: determining a set of post-registration correction terms for the algorithm according to the method for determining a set of post-registration correction terms described above; and comparing a variation among the values of the registered images at a selected region of the array with a variation expressed by a superposition of the post-registration correction terms.

The method for correcting artifacts can include any of the following features. Comparing can include performing a regression on the values of the registered images at the selected region of the array in terms of the post-registration correction terms, and if desired, one or more stimulus terms. Comparing can also include comparing a variation among the values of the registered images at an additional selected region of the array with a variation expressed by a superposition of the post-registration correction terms. The selected region of the array can be a selected point of the array. Comparing can also include comparing variations among the values of the registered images at each point of the array with a variation expressed by a superposition of the post-registration correction terms.

Comparing can also include performing a regression on the values of the registered images at selected regions of the array in terms of the post-registration correction terms and a stimulus term to determine a regression value for each of the post-registration correction terms and the stimulus term at each of the selected regions. In this case, the method can further include constructing an output image based on the regression value for the stimulus term at each of the selected regions, or the stimulus term and a regression residual for each of the selected regions.

The method can also include subtracting from the values of the registered images at the selected region of the array the superposition of the post-registration correction terms.

In another aspect, the invention features a second method for correcting artifacts introduced into images registered by an algorithm that repositions unregistered images along a selected coordinate, wherein the algorithm repositions each of the unregistered images along the selected coordinate by a repositioning value and wherein the registered images are represented by image values at an array of points. The second method includes comparing a variation among the image values of the registered images at a selected region of the array with a variation expressed by a superposition of at least one post-registration correction terms, wherein one of the post-registration correction terms is a vector equal to the values of a polynomial in the selected coordinate at each of the repositioning values, and wherein the polynomial is a second or higher order polynomial.

The second method for correcting artifacts can include any of the following features. The selected coordinate can be a rotational coordinate and each of the repositioning values can be an angle. Another of the post-registration correction terms can be a vector equal to the values of a linear function in the selected coordinate at each of the repositioning values.

Comparing can include performing a regression on the image values of the registered images at selected regions of the array in terms of the post-registration correction terms and at least one stimulus term to determine a regression value for the stimulus term at each of the selected regions. In this case, the second method can also include constructing an output image based on the regression value for the stimulus term at each of the selected locations. Comparing can also include performing a regression on the image values of the registered images at selected regions of the array in terms of the post-registration correction terms to determine a regression value for each of the post-registration terms at each of the selected regions. The selected regions of the array can be selected points of the array.

In another aspect, the invention features a computer program, residing on a computer readable medium. The computer program includes instructions that cause a computer to perform the method of determining post-registration correction terms, the first method for correcting artifacts, and/or the second method for correcting artifacts, all of which are described above.

The invention also features an image processing system, which includes: an input port for receiving a series of images; a data storage device, operably coupled with the input port, for storing the images; and a processor, operably coupled with the input port and data storage device, for registering the images with a registration algorithm, wherein the processor performs the method of determining post-registration correction terms, the first method for correcting artifacts, and/or the second method for correcting artifacts, all of which are described above.

The invention further features an apparatus comprising a computer readable medium storing a program that causes a processor to perform the method of determining post-registration correction terms, the first method for correcting artifacts, and/or the second method for correcting artifacts, all of which are described above., residing on a computer readable medium.

Images can be represented by values at an array of points. For example, if an image is intense or bright at a particular location, the value of the image at the point corresponding to that particular location is higher or larger than the values of the image at points corresponding to other locations. For a series of images represented by values at a common array of points, variations among the values at a selected point correspond to the set of values themselves, or changes or differences among the values, at the selected point. For example, for a series of five images, the values of the five images at particular point, e.g., a corner point, may be 2, 4, 3, 5, 1, respectively, in some arbitrary units. Thus, for example, the variations can be represented by the vector, [2, 4, 3, 5, 1], or, since the average of the values is 3, the variations can be represented by the zero-sum vector [−1, 1, 0, 2, −2]. Similar variations among the values of images can be calculated at every point of the array. Alternatively, a subset of points can define a selected region, e.g., a single point, of the array, and variations among the values of the images at the selected region of the array can be calculated from the average, or some other function, of the variations of at each point in the selected region of the array. In some cases, superpositions of a relatively small number of post-registration correction vectors can approximate variations among the values of images at a large number of points, in which the variations are artifacts caused by image registration. A superposition of post-registration correction terms is a sum of scaled post-registration correction terms, wherein each scaled post-registration correction term is a post-registration correction term multiplied by an independent scalar factor. As summarized above, the invention provides methods and systems for determining and using such post-registration correction terms to remove or identify registration artifacts in a series of registered images.

Unless otherwise defined, all technical and scientific terms used herein have the same meaning as commonly understood by one of ordinary skill in the art to which this invention belongs. Although methods similar or equivalent to those described herein can be used in the practice or testing of the present invention, suitable methods are described below. All publications, patent applications, patents, and other references mentioned herein are incorporated by reference in their entirety. In case of conflict, the present specification, including definitions, will control. In addition, the methods and examples described herein are illustrative only and not intended to be limiting.

The invention provides many advantages. The methods and systems of the invention use post-registration correction terms to remove resampling artifacts from registered fMRI images. By removing such artifacts, the remaining variations in fMRI images can be more meaningfully correlated with functional changes in the imaged object, which is the goal of fMRI imaging. The invention also provides methods and systems for determining suitable post-registration correction terms. Once determined, the post-registration correction terms can be saved for use in subsequent registration applications. In addition, the invention provides several nonlinear polynomials that are useful post-registration correction terms for rotational registration.

Other features and advantages of the invention will be apparent from the following detailed description, and from the claims.

DETAILED DESCRIPTION

The invention features methods and systems for removing artifacts introduced into a registered series of images by any algorithm used to register the series of images. Typically, the series of images are time-series images in which the images are representations of the same object at different points in time. Depending on the application, the interval between images can be short (e.g., one second or less), as in applications such as functional magnetic resonance imaging (fMRI) of the brain, or the interval can be long (e.g., years), as in applications such as aerial photography of a section of land. Also, the images can be two-dimensional or three-dimensional.

The invention can be implemented in hardware or software, or a combination of both. The invention can be implemented in computer programs using standard programming techniques following the method and figures described herein. Program code is applied to input data to perform the functions described herein and generate output information. The output information is applied to one or more output devices such as a display monitor.

Each program is preferably implemented in a high level procedural or object oriented programming language to communicate with a computer system. However, the programs can be implemented in assembly or machine language, if desired. In any case, the language can be a compiled or interpreted language.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The system can also be considered to be implemented as a computer-readable storage medium, configured with a computer program, where the storage medium so configured causes a computer to operate in a specific and predefined manner to perform the functions described herein.

Image Acquisition and Registration

In many fMRI applications, time-series images are processed to identify and analyze changes in the images that occur over time and/or in response to a stimulus, which may be time-varying. Obtaining raw fMRI time-series images is achieved by known techniques using commercially available equipment. For example, a General Electric (GE) Signa 1.5 Tesla Magnetic Resonance Scanner (made by GE Medical Systems, Milwaukee, Wis.) can be retrofit with an InstaScan® resonating whole body gradient set from Advanced NMR Systems, Inc. to perform echo-planar imaging (EPI). Other MRI models are also sold by GE, and other manufacturers of MRI scanners include Phillips, Siemens, and Toshiba.

Figure 1:
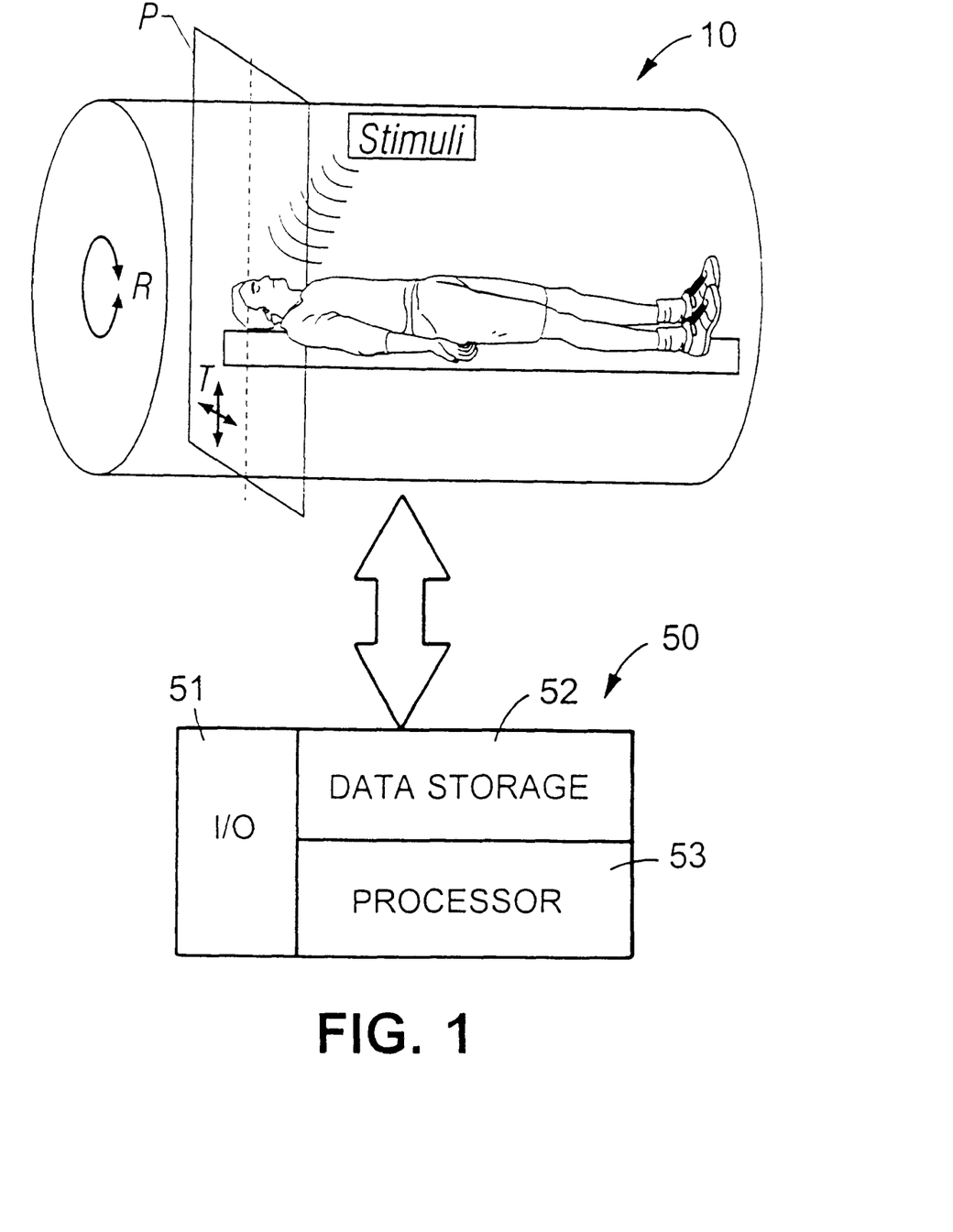
FIG. 1 is a schematic diagram of a magnetic resonance imaging scanner and a processing system for image analysis.

FIG. 1 illustrates a system for acquiring FMRI time-series images. A patient is initially positioned in an MRI scanner 10. Conventional MRI images are used to define an image plane P (or planes) of interest. A sequence of M echo-planar images I per plane are captured, where M is typically 256 or 128, but could be any number. With a repetition time of about one second, it usually takes about four and one-half minutes to obtain 256 images. MRI scanner 10 records the M images ($I_1$ to $I_M$) as digital image data, which is available for viewing or further processing.

Generally, the patient will not remain completely motionless during the imaging period. In fMRI, the patient is often subjected to one or more stimuli, such as a flashing light, which increases the likelihood that the patient will move. Therefore, there is a high probability that motion artifacts are introduced into the M images. Rotational and translational motion are shown in FIG. 1 by arrows R and T, respectively. EPI images are high resolution images, and subject motion of as little as 0.2 mm can introduce motion artifacts into time-series images. The motion artifacts, if not corrected, corrupt the temporal correlation between the stimulus and the images, leading to inaccurate and unreliable results.

The MRI scanner stores each image $I_m$, where $m=1, \ldots, M$, as digital information in an N-by-N square array of 16-bit unsigned integers, where N is typically 128 or 64. Thus, the time series image data consists of an array of N-by-N-by-M 16-bit unsigned integers. In other embodiments, the image dimensions can be different than square, and the dimensions can be varied depending on the particular application. Also, depending on the particular MRI scanner, other data formats can be used. The MRI scanner image data format is not typically suitable for the registration processing described below. Therefore, the MRI scanner image data format (e.g., 16-bit unsigned integers) may be converted into an array of 32-bit floating point numbers.

MRI scanner 10 sends the time-series images to a processing system 50, which includes an input/output port 51, data storage 52, and processor 53. As described below, a registration program, e.g., stored in data storage 52, causes processor 53 to perform steps that process the raw time-series images to register the images. Data storage 52 can be any suitable data storage device, including magnetic tape, magnetic disk, or semiconductor memory. Input/output port 51 is of known design and capable of communicating with other devices by various known protocols.

The images sent to processing system 50 are each represented by values on a discrete array of points, e.g., the N-by-N square grid, a rectangular grid, a three-dimensional rectangular array, and a three-dimensional spherical or elliptical array. The processor selects one of the images as a reference image $I_{Ref}$, to which the other images are registered. Typically, the processor selects the middle image $I_{M/2}$ as the reference image, since such a selection tends to minimize the differences between the reference image and each of the other images. Using any known or new registration algorithm, the processor generates a registered series of images $R_m$, where m=1, ..., M by comparing each of the raw images, $I_1$ to $I_M$, to the reference image, $I_{Ref}$. The registration algorithm involves two steps: 1) estimating for each image, $I_m$, translations and rotations that best align the features of $I_m$, with the features of $I_{Ref}$; and 2) generating for each image, $I_m$, a registered image, $R_m$, represented by values on the discrete array of points that correspond to $I_m$ repositioned by the estimated translations and rotations. In addition, the registration algorithm may resize each of the images according to various linear or non-linear transformations to produce the registered images. For two-dimensional images, the translation and rotations correspond to two in-plane translations, denoted by x and y, and one in-plane rotation, denoted by θ. For three dimensional images, there are three translations and three rotations, e.g., pitch, yaw, and roll, that are estimated to register the images. The registration program can include one or more suitable registration algorithms, such as the "Decoupled Automated Rotational and Translational" (DART) registration algorithm of L. C. Maas et al., *Magn. Reson. Med.*, 37:131–139, 1997, and the registration algorithm of A. Apicella et al., *SPIE Medical Imaging III: Image Processing*, 1092:252–263, 1989.

Post-Registration Correction

Processing system 50 also includes a post-registration program, e.g., stored in data storage 52, that causes processor 53 to perform steps that remove artifacts introduced by the registration algorithm from the series of registered images. Such artifacts arise because electronic images require that each of a series of registered electronic images be represented by values on a common array of discrete points. To generate such registered images, the registration algorithm resamples the misregistered images onto the common array of discrete points. Such resampling introduces ringing, aliasing, and a loss of high-frequency spatial information. For example, to construct a registered image, a portion of the image is often resampled outside of the original sampling region, where no data has been collected. Also, registration of the images tends to reorient high-frequency edges and boundaries, producing ringing and aliasing artifacts, and corrupting image information.

To remove the artifacts, the program causes the processor to correlate variations between the registered images at particular regions, e.g., variations in the values of the registered images at each of the discrete points of the common array, to post-registration correction terms, which can be determined using methods described below. The post-registration correction terms are functions or vectors that describe variations produced by the registration algorithm in terms of repositioning coordinates (e.g., x, y, and θ for two-dimensional images).

In general, the series of images registered by the registration program can be expressed as $R_{mn}$ with repositioning coordinates $C_{mp}$, where m=1 to M and is an index that denotes the particular image in the series, n is an index that denotes the particular points in the image, e.g., for the two-dimensional N-by-N images described above, n=(1 to N, 1 to N), and p is an index that denotes the particular repositioning coordinate, e.g., for two dimensional images, p=1 to 3 which corresponds to x, y and θ. For example, if the first raw image in the time series, $I_1$, was repositioned by translating along the x-axis by 2 units, translating along the y-axis by 1 unit, and rotating in the plane by 3 units, $C_{11}$=2, $C_{12}$=1, and $C_{13}$=3.

The post-registration correction terms can be expressed as a function $n_{pk}(\zeta_p)$, where p is an index denoting the particular repositioning coordinate as in $C_{np}$, k is an index labelling a particular one of the one or more post-registration correction term for coordinate p, and the argument $\zeta_p$ is the coordinate referred to by the subscript p.

The processor performs a regression to fit the variations in $R_{mn}$ to a superposition of vectors determined from the post-registration correction functions and, if appropriate, a stimulus term $F_m$. The stimulus term $F_m$ is a time-series vector expression that corresponds to the stimulus used when collecting the original image data. For example, if the images were recorded at 1 second intervals and lights that were turned on for 1 second at 5 second intervals were used as the stimulus, $F_m$=(1,0,0,0,0,1,0,0,0,0, . . . ). In other examples, the stimulus term can have entries different from only 1's and 0's, for example, the stimulus term can be ramped for progressively difficult tasks. In general, the stimulus term can be any model of expected activity. The processor determines values for $\lambda_{pkn}$ and $\Lambda_n$ such that the expression:

$$R'_{mn} = \Lambda_n \cdot F_m + \Sigma_{pk} \lambda_{pkn} \cdot n_{pk}(C_{mp}) \tag{1}$$

minimizes the residual ($res_n$):

$$res_n = \Sigma_m (R_{mn} - R'_{mn})^2 \tag{2}$$

In other words, for each point in the registered images, the processor correlates variations in the series of registered images at that point to the stimulus term FM and the post-registration correction terms, which are sampled at the repositioning coordinates of each of the registered images. The processor can perform the regression using methods known in the art, see, for example, W. H. Press at al, *Numerical Recipes in C: The art of scientific computing*, (Cambridge University Press, 1993).

The regression determines a more accurate correlation between the stimulus and the variations in the time-series images by including the post-registration correction terms in the regression. In many brain imaging experiments, determining which regions of the brain have activity that strongly correlates with the stimulus is the goal of the experiments. The processor can construct a stimulus correlation image, $G_n$, based on the regression data, as follows:

$$G_n = \Lambda_n / \sqrt{res_n} \tag{3}$$

The $\Lambda_n$ term indicates the correlation of the time-series registered images at each point with the stimulus and the $\sqrt{res_n}$ term weights $\Lambda_n$ to account for the accuracy of the regression.

In other embodiments, the processor generates other types of correlation images based on the correlation of the variations in the series of registered images with some other time series vector, e.g., a vector $K_m$ that is a model of expected activity in the absence of, or in addition to a stimulus term. This may occur in brain imaging for a case in which a patient is injected with a drug that initiates some expected brain activity. In such embodiments, the $K_m$ term is added to the regression in Eq. 1 in place of, if there is no stimulus, or in addition to, $F_m$, and the regression coefficient for $K_m$ at each point is divided by the square root of the residual at that point, as in Eq. 3, to generate the correlation image. By including the post-registration correction terms in Eq. 1, the regression results for $F_m$ and $K_m$, and the correlation image, do not include artifacts introduced by the registration algorithm.

In other embodiments in which the time-series images were collected without a stimulus, the processor performs the regression without the $\Lambda_n \cdot F_m$ term in Eq. 1. That is:

$$R'_{mn} = \Sigma_{pk} \lambda_{pkn} \cdot n_{pk} (C_{mp}) \quad (4)$$

In such cases, the processor uses the post-registration correction terms to remove registration artifacts from the registered images and thereby generate corrected images, $P_{mn}$, as follows:

$$P_{mn} = R_{mn} - R'_{mn} \quad (5)$$

The processor may use the corrected images in further image processing. The processor can also generate corrected images for embodiments that include a stimulus. In such a case, the corrected images are expressed as:

$$P_{mn} = R_{mn} - \Sigma_{pk} \lambda_{pkn} \cdot n_{pk} (C_{mp}) \quad (6)$$

The post-registration correction terms can also take different forms. For example, rather than being expressed as functions that are sampled at the arguments $C_{mp}$, they can be expressed as the corresponding vector. Also, rather than having one or more post-registration correction terms for each repositioning coordinate, the post-registration correction term can be expressed as functions that depend on more than one of the repositioning coordinates. For example, if the post-registration correction terms were expressed as functions in term of all of the repositioning coordinates, i.e, $n_k(p_1, p_2, \ldots)$, the regression in Eq. 1 would be expressed as:

$$R'_{mn} = \Lambda_n \cdot F_m + \Sigma_k \lambda_{kn} \cdot n_k (C_{m1}, C_{m2}, \ldots) \quad (7)$$

In all cases, for a statistically significant regression, the number of post-registration correction terms must be less than the number of images in the time series. For example, if there are K post-registration correction terms for all coordinates, then K must be less then M.

For two-dimensional images, post-registration artifacts associated with translation of the images during registration are often smaller than the post-registration artifacts associated with in-plane rotation of the images during registration. As described in the Examples below, post-registration correction terms corresponding to the first six Legendre polynomials are useful in removing post-registration artifacts produced by in-plane rotation during registration. The set of Legendre polynomials is a complete set of orthogonal functions. The first six Legendre polynomials (within a scaling factor) in terms of in-plane rotation θ are:

$$L_1(\theta) = \theta \quad (8)$$

$$L_2(\theta) = 3\theta^2 - 1 \quad (9)$$

$$L_3(\theta) = 5\theta^3 - 3\theta \quad (10)$$

$$L_4(\theta) = 35\theta^4 - 30\theta^2 + 3 \quad (11)$$

$$L_5(\theta) = 63\theta^5 - 70\theta^3 + 15\theta \quad (12)$$

$$L_6(\theta) = (11/6)\theta L_5(\theta) - (5/6)L_4(\theta) \quad (13)$$

Figure 2:
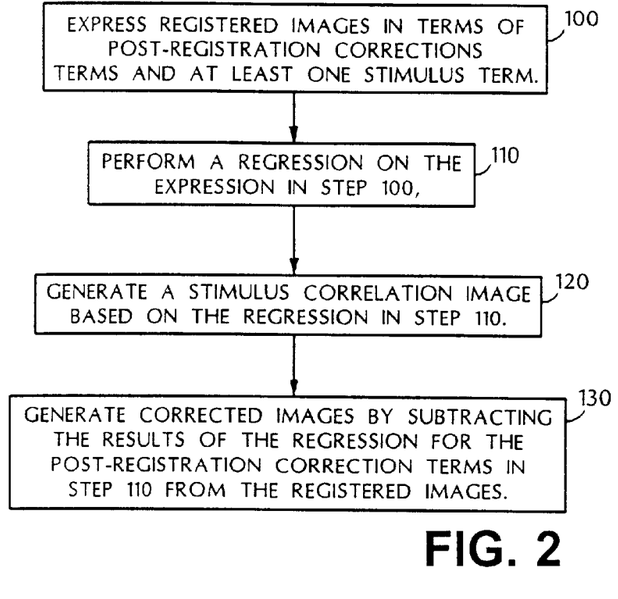
FIG. 2 is a flow chart of a method in which post-registration correction terms are used to remove artifacts from registered images registered.

Thus, for some embodiments in which the MRI scanner records M N-by-N two-dimensional images $I_{mn}$ in response to a stimulus $F_m$ and the processor registers the images $I_{mn}$ to generate registered images $R_{mn}$, which involved rotating each of the images $I_m$ by $\theta_m$, the post-registration program causes the processor to perform the following steps, as shown in the flow chart in FIG. 2.

In step 100, the processor creates an expression for $R'_{mn}$, which equals:

$$R'_{mn} = \Lambda_n \cdot F_m + \Sigma_{k=1 \text{ to } 6} \lambda_{kn} \cdot L_k (\theta_m) \quad (14)$$

In the next step, step 110, the processor performs a regression on the expression in Eq. 14 to determine values for $\lambda_n$ and $\lambda_{kn}$ that minimize the residual ($\text{res}_n$):

$$\text{res}_n = \Sigma_m (R_{mn} - R'_{mn})^2 \quad (2)$$

at each point n. Then, in step 120, the processor generates a stimulus correlation image $G_n$, as described by:

$$G_n = \Lambda_n / \sqrt{\text{res}_n} \quad (3)$$

In other embodiments, different expressions for $G_n$ can be used, such as a general expression for a T-distributed variable, or any other statistical formula known in the art. Such expressions generally depend on $\lambda_n$ and $\text{res}_n$, and possibly other terms such as M and K.

In step 130, to generate corrected images $P_{mn}$ in which artifacts introduced by the registration algorithm are removed from the registered images $R_{mn}$, the processor determines $P_{mn}$ as follows:

$$P_{mn} = R_{mn} - \Sigma_{k=1 \text{ to } 6} \lambda_{kn} \cdot L_k(\theta_m) \quad (15)$$

The procedure outlined above and in the flow chart in FIG. 2 is suitable for registration algorithms in which rotation of the images is performed in wavevector space (e.g., Fourier registration), such as in the DART algorithm of Maas et al, supra, which utilizes a regridding technique in wavevector space. The procedure can be modified for other registration algorithms in which the rotation is performed in image space, such as by linear or multilinear interpolation, see, for example, T. Pavlidis, *Algorithms for Graphics and Signal Processing*, Chapter 13 (Computer Science Press, Rockville, Md., 1982). In such cases, the processor performs the following steps, as shown in the flow chart of FIG. 3.

Figure 3:
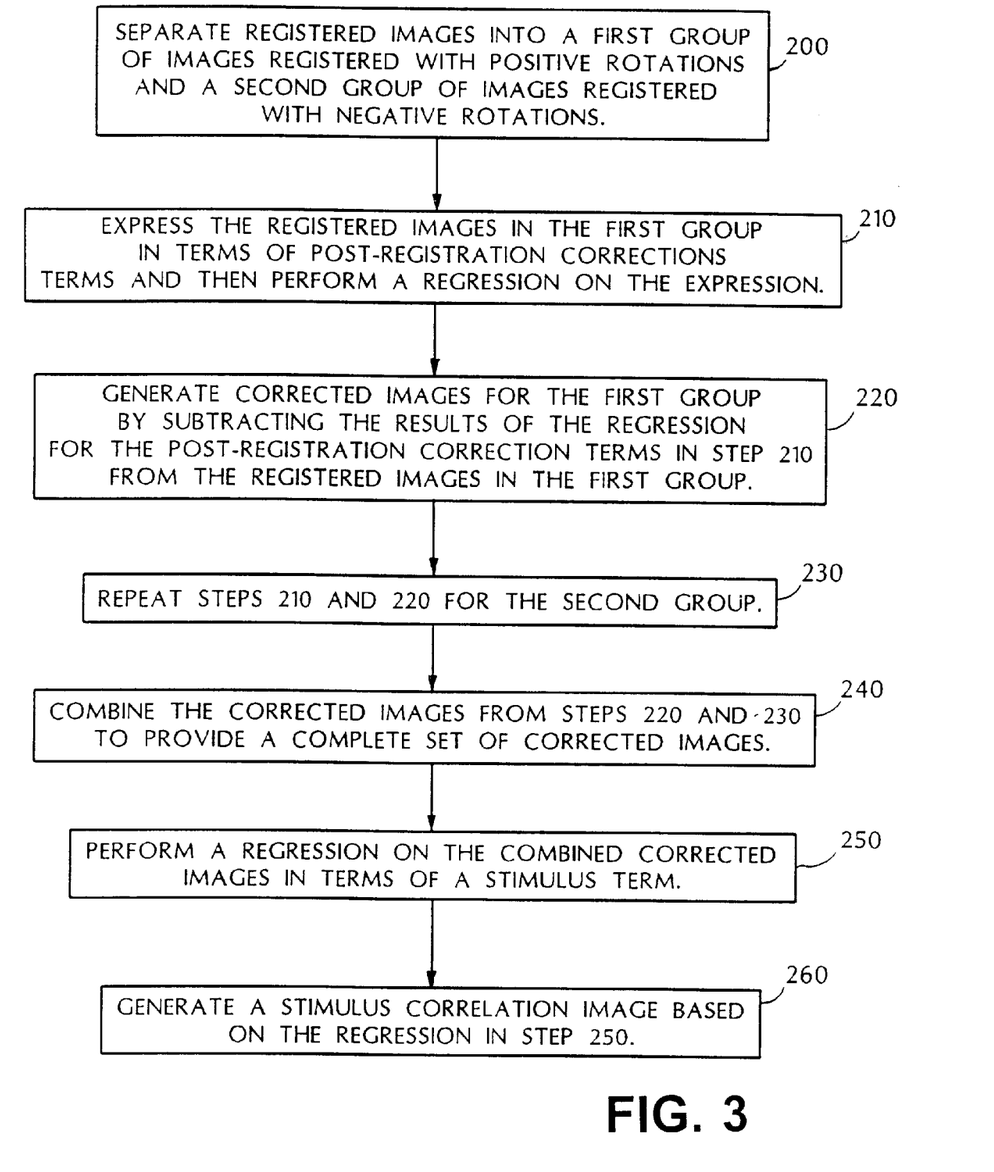
FIG. 3 is a flow chart of another method in which post-registration correction terms are used to remove artifacts from registered images registered.

In step 200, the processor separates $R_{mn}$ into a first group for which $\theta_m > 0$, and a second group for which $\theta_m < 0$.

In step 210, the processor performs a regression on the expression:

$$R'_{mn} = \Sigma_{k=1 \text{ to } 6} \lambda_{kn} \cdot L_k (\theta_m) \quad (16)$$

to determine values for $\lambda_{kn}$ that minimizes the residual ($\text{res}_n$):

$$\text{res}_n = \Sigma_m (R_{mn} - R'_{mn})^2 \quad (2)$$

at each point n for the $R_{mn}$ in the first group. In step 220, the processor generates corrected images $P_{mn}$ for the $R_{mn}$ in the first group, according to:

$$P_{mn} = R_{mn} - \Sigma_{k=1 \text{ to } 6} \lambda_{kn} \cdot L_k(\theta_m) \quad (15)$$

In step 230, the processor repeats steps 210 and 220 for the $R_{mn}$ in the second group, thereby generating $P_{mn}$ for the registered images in the second group. In step 240, the corrected images $P_{mn}$ from steps 220 and 230 are recombined to provide a complete set of corrected images. In step 250, the processor performs a regression on the expression:

$$P'_{mn} = \Lambda_n \cdot F_m \quad (17)$$

to determine values for $\Lambda_n$ that minimizes the residual ($res_n$):

$$res_n = \Sigma_m (P_{mn} - P'_{mn})^2 \quad (18)$$

at each point n for all m=1 to M. In step 260, the processor generates a stimulus correlation image $G_n$, as given by:

$$G_n = \Lambda_n / \sqrt{res_n} \quad (3)$$

In other embodiments, different expressions for $G_n$ can be used, such as a general expression for a T-distributed variable, or any other statistical formula known in the art. Such expressions generally depend on $\Lambda_n$ and $res_n$, and possibly other terms such as M and K.

Alternatively, for embodiments in which the registration algorithm performs rotations in image space, the processor can insure that $\theta_m > 0$ by rotating all of the images $I_{mn}$ by a sufficiently large offset angle or by an appropriate selection of $I_{refn}$.

In other embodiments, the post-registration correction terms used in FIGS. 2 and 3 can include more than, or fewer than, the first six Legendre polynomials. In addition, the post-registration correction terms can also include a zeroth order Legendre polynomial, i.e., a constant term, e.g., $L_0(\theta) = 1$, to account for a constant offset in the image values. In such a case, the summations in Eqs. 14, 17, 18, and 20 start from k=0 rather than k=1.

Rather than using the first six Legendre polynomials as a set of post-registration correction terms, a set of post-registration correction terms can include other polynomial functions, at least one of which includes a higher order term (i.e., a non-linear term) in $\theta$. For example, a set of post-registration correction terms can include a constant term, e.g., $f_0(\theta) = 1$, a linear term, e.g., $f_1(\theta) = \theta$, and a quadratic term, e.g., $f_0(\theta) = \theta^2$. Such polynomial functions can also be used as post-registration correction terms that remove artifacts introduced by out-of-plane rotations during the registration of three-dimensional images.

Determination of Post-Registration Correction Terms

Post-registration correction terms are determined by applying a registration algorithm to a series of images for which the only differences between the registered images arise from the registration algorithm itself. For example, if a series of images of a temporally invariant reference object in different orientations is recorded and the images are then registered, differences between the registered images must arise from artifacts introduced by the registration algorithm. Alternatively, rather than record images of a temporally invariant reference object, simulated images of a temporally invariant reference object in different orientations can be generated. In particular, a function that provides a representation of a reference object in terms of its orientations can be sampled onto an array of discrete points to generate the simulated images. Post-registration correction terms are determined from the differences between the registered images of the reference object by determining a set of basis vectors that can express the differences between the images at each of many regions of the images, e.g., at each of the array points of the images, with statistical significance.

The processing system 50 also includes a post-registration correction term program that cause processor 53 to determine suitable post-registration correction terms for use in the post-registration program described above. Referring to the flow chart in FIG. 4, the post-registration correction term program causes the processor to perform the following steps.

Figure 4:
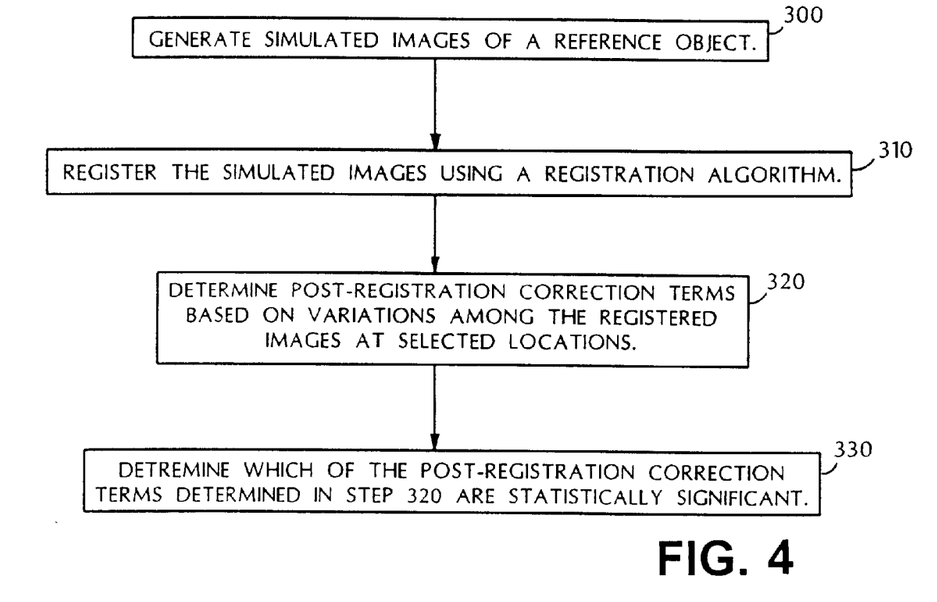
FIG. 4 is a flow chart of a method to determine post-registration correction terms.
Figure 5A:
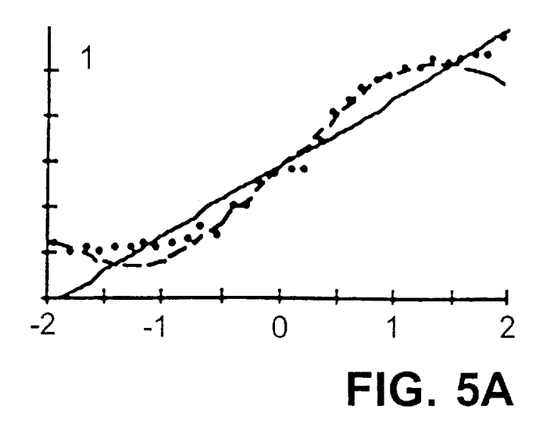
FIGS. 5A to 5F are a series of graphs illustrating six eigenvectors from a principle component analysis of the differences between registered images.
Figure 5B:
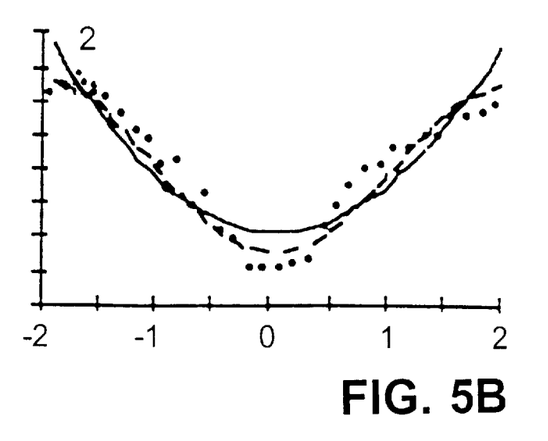
Figure 5C:
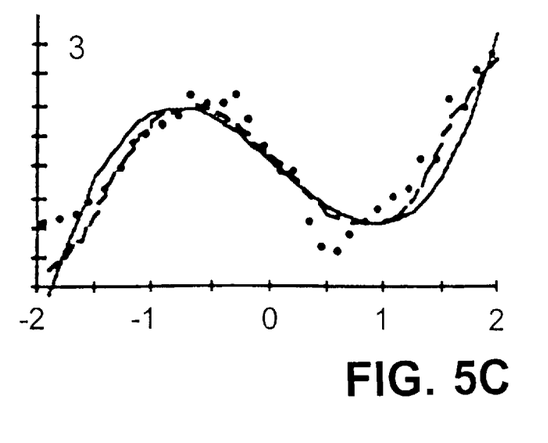
Figure 5D:
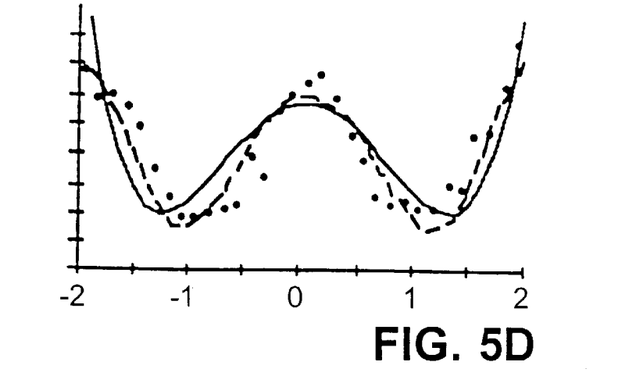
Figure 5E:
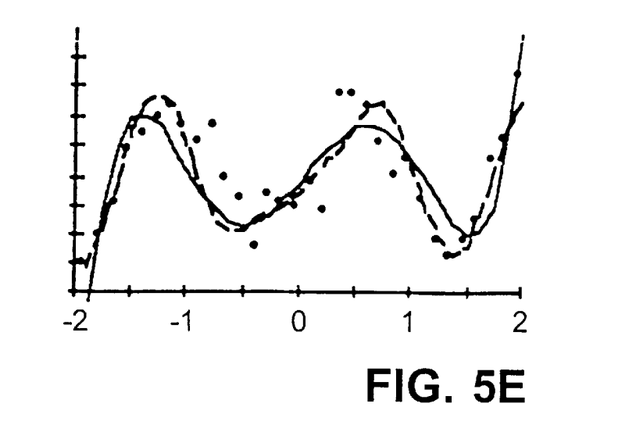
Figure 5F:
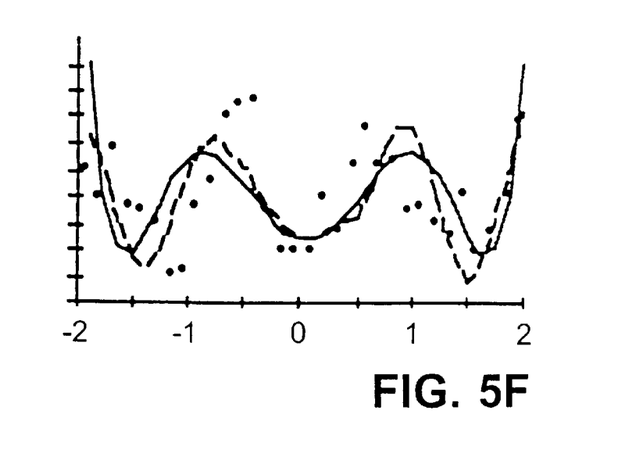

In step 300, using an input function $f(x,\zeta)$ for a reference object, where x denotes a particular location, e.g., translational coordinates x and y for a 2D object or x, y, and z for a 3D object, and $\zeta$ denotes a particular orientation for the reference object along a selected coordinate, e.g., in-plane rotation, the processor generates simulated images for the reference object by sampling the function on an array of discrete points for a series of M orientations. The series of simulated images can be expressed as $I'_{mn}$, where the index m denotes the orientation, e.g., an in-plane angle, and the index n denotes a specific point on the array. Since the images $I'_{mn}$ are determined from the function $f(x,\zeta)$, they are exact image representations of the simulated reference object in different orientations.

In step 310, the processor registers the simulated images using a registration algorithm (e.g., the DART algorithm described in Maas et al., supra). From the simulated images $I'_{mn}$, the registration algorithm determines the orientations of the simulated images. Alternatively, the exact orientations used to generate the simulated images $I'_{mn}$ in step 300 are input directly into the registration algorithm. In either case, the orientations give the repositioning coordinate $C_{mp}$ for each simulated image required to register the simulated images. For example, if the simulated images were oriented with different amounts of in-plane rotation, the repositioning coordinates would be $\theta_1, \theta_2, \ldots \theta_M$, where $\zeta = \theta_m$ in the argument of $f(x,\zeta)$ used to generate $I'_{mn}$. Using the repositioning coordinates for each simulated image, the registration algorithm generates registered images $R_{mn}$.

Since the registration algorithm may introduce artifacts into the registered images, the images $R_{mn}$ may no longer be exact representations of the reference object in a particular orientation. In step 320, the processor determines K post-registration correction vectors $N_{m1}, N_{m2}, \ldots N_{mK}$, from the differences between the registered images $R_{mn}$. In particular, the processor determines $N_{mk}$ such that there exists $\lambda_{kn}$ which minimize the residual (res)

$$res = \Sigma_{nm} (R_{mn} - \Sigma_k \lambda_{kn} \cdot N_{mk})^2 \quad (19)$$

As shown in Eq. 19, the processor determines the post-registration correction vectors by minimizing a residual that is summed over every point of the registered images, i.e., summed over the index n. In other embodiments, the residual is summed only over selected subset of points, e.g., points that lie within the reference object and not in the background.

To determine the Nmk vectors, the processor can perform multiple linear regressions on Eq. 19, however, depending on the size of K, this can be computationally expensive. Alternatively, the processor performs principle component analysis on $R_{mn}$, which involves decomposing the covariance matrix $\Lambda$ of $R_{mn}$ into its eigenvectors. The covariance matrix $\Lambda$ is an M-by-M matrix given by:

$$\Lambda(m1, m2) = \Sigma_n (R_{m1,n} - R^m{}_{m1,n}) \cdot (R_{m2,n} - R^m{}_{m2,n}) \quad (20)$$

where $R^m{}_{mn}$ is the mean of $R_{mn}$, which for N-by-N images is:

$$R^m{}_{mn} = \Sigma_n R_{mn}/N^2 \qquad (21)$$

The eigenvectors from a decomposition of $\Lambda(m1,m2)$ gives the post-regression correction vectors $N_{mk}$, and the relative size of the corresponding eigenvalue for each eigenvector gives the statistical significance of that eigenvector as a post-regression correction vector. For more information on principle component analysis, see, for example, A. Basilevsky, *Statistical factor analysis and related methods: theory and applications*, pp. 97–346 (John Wiley and Sons, New York, 1994).

In other embodiments, the processor can determine each post-regression correction vector iteratively in the order of their statistical significance. For example, the processor determines the first post-registration correction vector $N_{m1}$ that minimizes the residual (res)

$$res = \Sigma_{nm} (R_{mn} - \lambda_{1n} \cdot N_{m1})^2 \qquad (22)$$

for some $\lambda_{1n}$, and then determines the second post-registration correction vector $N_{m2}$ that minimizes the residual (res):

$$res = \Sigma_{nm} (R_{mn} - \lambda_{1n} \cdot N_{m1} - \lambda_{2n} \cdot N_{m2})^2 \qquad (23)$$

for some $\lambda_{2n}$ with $N_{m1}$ and $\lambda_{1n}$ being fixed and equal to the results from the first minimization. The processor determines the third and subsequent post-registration correction vectors by performing similar minimizations in which terms from earlier minimizations are fixed.

In step 330, the processor determines which of the post-regression correction vectors are statistically significant. Since the variance in the series of M registered images at any particular point is given by a vector having M components, any set of M independent post-regression correction vectors $(N_{m1}, N_{m2}, \ldots N_{mM})$ can make the residual, res, in Eq. 19 equal to zero. As a general rule, a particular one of the post-regression correction vectors is statistically significant if it accounts for more than 1/M of the variance between each of the registered images over the aggregate of points in the images. Often, because of noise in the images, a post-registration correction vector is used only if it accounts for more than 2/M of the variance between each of the registered images over the aggregate of points, or some other empirically-selected threshold based on statistics, see, e.g., A. Basilevsky, supra.

In step 340, the processor fits each of the statistically significant post-regression correction vectors to a function in the coordinate along which the simulated images were registered. The functions are selected from a library of common mathematical functions, e.g., polynomials, exponentials, etc., which are stored in data storage 52. The functions that best fit the post-regression correction vectors are designated as the post-registration correction terms $n_{pk}$ (p) used on Eq. 1. The post-registration correction terms are stored in the processing system and used to remove artifacts from images recorded by the MRI scanner as described above. Alternatively, the processor stores the statistically significant post-registration correction vectors in the data storage. To perform the post-registration correction on images recorded by the scanner, the post-registration correction vectors are resampled onto the repositioning coordinates determined by the registration algorithm to produce the vectors $n_{pk}(C_{mp})$ in Eq. 1.

EXAMPLE

Experimental data was collected using a 1.5 Tesla General Electric Signa scanner retrofit with an echo planar gradient set from Advanced NMR, Inc. (Natick, Mass.). A set of 32 echo planar images (gradient echo, repetition time=1 s, echo time=40 ms, RF pulse flip angle=75°, slice thickness 7 mm) was collected from a 37 year-old male subject with a quadrature head coil in an axial slice through the thalamus as the subject slowly rotated his head at a constant velocity. The images were registered using the DART registration algorithm of Maas et al., supra. The registration algorithm also determined the amount of rotation for each image required to register the set of images.

Then, a set of 32 simulated MR images of a perfect cylinder was synthesized. The simulated images were each rotated by the amounts corresponding to the registration of the first set of images using the DART registration algorithm. Since a perfect cylinder is rotationally invariant, differences between the images in the second set were necessarily caused by the registration algorithm. A final set of 640 images (repetition time=1 s) was collected with the subject instructed to lie motionless.

The registration noise was modeled as a linear combination of orthonormal basis functions. Principal component analysis (PCA) was used to extract the temporal basis functions explaining the largest variance in the first image data set. The principal components extracted from the experimental and synthetic data sets were compared to each other and to an analytic model based on the normalized Legendre polynomials $$P'_k[n] = p_k\left(\frac{2(n-1)}{N-1} - 1\right), \qquad (24)$$

where $P_k(x)$ is the kth Legendre polynomial. The first six terms of the model were tested in the final data set using linear regression techniques, with significance defined at the p=0.05 level.

Registration of the first experimental data set with the DART algorithm indicated that the subject succeeded in approximating linear motion through the range −2° to +2°. The six experimental eigenvectors computed from the registered experimental data set accounted for 26.2%, 11.4%, 7.68%, 4.97%, 3.28% and 2.56%, of the image set variance, for a total of 56.1%. PCA of the simulated data set yielded similar results for the largest eigenvectors. The six eigenvectors accounted for 61.1%, 27.0%, 5.97%, 1.96%, 1.16% and 0.61% of the simulated image set variance, for a total of 97.7%.

The percentages for each eigenvector stated in the previous paragraph was determined from the corresponding eigenvalue resulting from the diagonalization of the covariance matrix in the principle component analysis. Qualitatively, the percentage indicated the degree to which a particular eigenvector (or post-registration correction term) accounted for differences between the series of images at corresponding points. For example, if a particular eigenvector $N_m$, where m=1 to M, accounted for 100% of the variance in a set of M images $R_{mn}$, then for every point n in the set images there exist a $\lambda_n$ such that $$R_{mn} - \Sigma_m (R_{mn}/M) = \lambda_n \cdot N_m \qquad (25)$$

In other words, the variance between the set of images at every point is completely characterized by the eigenvector $N_m$.

FIGS. 5A–5F show the first six eigenvectors, respectively, determined by the principle component analysis for the first experimental data set, as shown by dots, and the second simulated data set, as shown by dashes. The similarity of the six eigenvectors shown for both the experimental and simulated data sets supports the hypothesis that the components are related to registration noise and not to other noise processes. The emergence of a small number of dominant eigenvectors supports the choice of an incomplete set of orthogonal basis functions to model registration noise. Furthermore, the data support a model based on the first six normalized Legendre polynomials, which are shown in FIG. 5 by shaded lines.

Using this model, the significance of registration noise was assessed in the final functional MRI experiment where the subject was instructed to lie motionless during data collection. Subsequent image registration revealed that the subject had in fact moved with a slow rotational drift covering 0.6° during data acquisition. Analysis of the registered data with multiple linear regression using the first six terms of the Legendre polynomial model revealed that the registration noise model was significant, capturing 18.8% of the total variance after registration, even in the absence of deliberate motion. Additionally, the first four terms were found to be significant when taken individually. These results indicate that linear regression using the registration noise model presented is useful in the analysis of functional MRI data sets, especially data sets demonstrating the common finding of slow rotational drifts prior to image registration.

OTHER EMBODIMENTS

It is to be understood that while the invention has been described in conjunction with the detailed description thereof, that the foregoing description is intended to illustrate and not limit the scope of the invention, which is defined by the scope of the appended claims. For example, in some embodiments, a particular post-registration correction term is suitable for more than one registration algorithm and for any region of the images. In other embodiments, post-registration correction terms are determined specifically for particular registration algorithms, particular regions of the images, and/or particular reference objects recorded by the images.

Other aspects, advantages, and modifications are within the scope of the following claims.

What is claimed is:

1. A method for correcting artifacts introduced by registering a first series of images with an algorithm, wherein the registered images are represented by values at a first array of points, the method comprising:

providing a second series of images, wherein each image in the second series corresponds to a particular orientation of a reference object;

registering the images in the second series with each other using the algorithm to produce a series of registered images in which the reference object in each of the registered images is in a common orientation, and wherein each of the registered images in the second series is represented by registered values at a second array of points;

determining a set of post-registration correction terms based on variations among the registered values of the registered images in the second series at each of selected points of the second array; and comparing a variation among the values of the registered images in the first series at each point of a selected region of the first array with a variation expressed by a superposition comprising the post registration correction terms.

2. The method of claim 1, wherein the set of post-registration correction terms is determined from principle component analysis of the variations among the registered values of the registered images of the second series at the selected points of the second array.

3. The method of claim 1, wherein each post-registration correction term comprises a vector having a factor for each of the particular orientations of the reference object.

4. The method of claim 1, wherein each of the post-registration terms comprises a function that depends on a coordinate corresponding to the particular orientations of the reference object.

5. The method of claim 1, wherein the first and second arrays are two-dimensional.

6. The method of claim 1, wherein the first and second arrays are three-dimensional.

7. The method of claim 1, wherein the particular orientations of the reference object are along a rotational coordinate.

8. The method of claim 1, wherein the particular orientations of the reference object are along a translational coordinate.

9. The method of claim 1, wherein the first and second arrays are identical to one another.

10. An image processing system comprising:

an input port for receiving a series of images;

a data storage device, operably coupled with the input port, for storing the images; and a processor, operably coupled with the input port and data storage device, for registering the images with a registration algorithm, wherein the processor performs the method of claim 1.

11. The method of claim 1, wherein comparing comprises performing a regression on the variation of the values of the registered images in the first series at each point of the selected region of the first array in terms of the post-registration correction terms.

12. The method of claim 11, wherein comparing comprises performing a regression on the variation of the values of the registered images in the first series at each point of the selected region of the first array in terms of the post-registration correction terms and at least one stimulus term.

13. The method of claim 1, wherein the selected region is all of the first array.

14. The method of claim 1, wherein the selected region of the first array is a selected point of the first array.

15. The method of claim 1, wherein comparing comprises comparing a variation among the values of the registered images at an additional selected region of the array with a variation expressed by a superposition of the post-registration correction terms.

16. The method of claim 1, further comprising:

subtracting from the values of the registered images in the first series at the selected region of the first array the superposition of the post-registration correction terms.

17. The method of claim 1, wherein comparing comprises performing a regression on the variation of the values of the registered images in the first series at each point of the selected region of the first array in terms of the post-registration correction terms and a stimulus term to determine a regression value for each of the post-registration correction terms and the stimulus term at each point of the selected region.

18. The method of claim 17, further comprising:

constructing an output image based on the regression value for the stimulus term at each point of the selected region.

19. The method of claim 18, further comprising:

constructing an output image based on the regression value for the stimulus term and a regression residual for each point of the selected region.

20. A method for correcting artifacts introduced into images registered by an algorithm that repositions unregistered images $I_m$ along at least one selected coordinate $\zeta_p$, wherein the algorithm repositions each of the unregistered images $I_m$ along the selected coordinates by a repositioning value $C_m$ and wherein the registered images are represented by image values $R_{mn}$ at an array of points, wherein the subscript m indexes the images, the subscript p indexes the selected coordinates, and the subscript n indexes the points of the array, the method comprising:

comparing a variation among the image values $R_{mn}$ of the registered images at each point of a selected region of the array with a variation expressed by a superposition comprising at least one post-registration correction term $n_{pk}(C_{mp})$, wherein one of the post-registration correction terms $n_{11}(C_{m1})$ is a vector equal to the values of a polynomial $n_{11}(\zeta_1)$ in the selected coordinate $\zeta_1$ at each of the repositioning values $C_{m1}$, and wherein the polynomial $n_{11}(\zeta_1)$ is a second or higher order polynomial in $\zeta_1$, and wherein the superposition can be expressed as $$\sum_{pk} \lambda_{pkn} \cdot n_{pk}(C_{mp}) + \cdots,$$

the subscript k indexing the post-registration correction terms for a particular coordinate $\zeta_p$, and $\lambda_{pkn}$ being a coefficient for the post-registration correction term $n_{pk}(C_{mp})$ at point n.

21. The method of claim 20, wherein the at least one selected coordinate $\zeta_p$ is a rotational coordinate $\zeta_1=\theta$, and wherein each of the repositioning values $C_{m1}$ is an angle $\theta_m$.

22. The method of claim 20, wherein another of the post-registration correction terms $n_{12}(C_{m1})$ is a vector equal to the values of a linear function $n_{12}(\zeta_1)$ in the selected coordinate $\zeta_1$ at each of the repositioning values $C_{m1}$.

23. The method of claim 20, wherein the superposition further comprises at least one stimulus term $F_m$, and comparing comprises performing a regression on the variation of the image values $R_{mn}$ of the registered images at each point of the selected region of the array in terms of the post-registration correction terms $n_{pk}(C_{mp})$ and the at least one stimulus term $F_m$ to determine a regression value $\Lambda_n$ for the stimulus term at each point of the selected region, where the superposition can be expressed as $$\Lambda_n F_m + \sum_{pk} \lambda_{pkn} \cdot n_{pk}(C_{mp}) + \cdots.$$

24. The method of claim 23, further comprising:
constructing an output image based on the regression value $\Lambda_n$ for the stimulus term at each point of the selected region.

25. The method of claim 21, wherein comparing comprises performing a regression on the variation of the image values $R_{mn}$ of the registered images at each point of the selected region of the array in terms of the post-registration correction terms $n_{pk}(C_{mp})$ to determine the coefficients $\lambda_{pkn}$ for each of the post-registration terms at each point of the selected region.

26. The method of claim 21, wherein the selected region of the array is a selected point of the array.

27. An image processing system comprising:
an input port for receiving a series of images;
a data storage device, operably coupled with the input port, for storing the images; and
a processor, operably coupled with input port and data storage device, for registering the images with a registration algorithm, wherein the processor performs the method of claim 20.

28. An apparatus comprising a computer readable medium storing a program that causes a processor to perform the method of claim 1.

29. An apparatus comprising a computer readable medium storing a program that causes a processor to perform the method of claim 20.

30. An image processing system comprising:
an input port for receiving a series of images;
a data storage device, operably coupled with the input port, for storing the images; and
a processor, operably coupled with the input port and data storage device, for registering the images with a registration algorithm, wherein the processor performs the method of claim 18.

31. An image processing system comprising:
an input port for receiving a series of images;
a data storage device, operably coupled with the input port, for storing the images; and
a processor, operably coupled with input port and data storage device, for registering the images with a registration algorithm, wherein the processor performs the method of claim 24.

32. An apparatus comprising a computer readable medium storing a program that causes a processor to perform the method of claim 18.

33. An apparatus comprising a computer readable medium storing a program that causes a processor to perform the method of claim 24.

34. A method for determining a set of post-registration correction terms that correct for artifacts introduced by an algorithm used to register images, the method comprising:

generating a series of simulated images of a reference object in multiple orientations by sampling a function $f(x,\zeta)$ indicative of the reference object onto a first array of points for each of the multiple orientations, where x denotes location and $\zeta$ denotes the orientation of the reference object;

using the algorithm to register the series of simulated images to produce a series of registered images represented by values at second array of points; and determining the set of post-registration correction factors by expressing variations among the values of the registered images at each of selected points of the second array in terms of a superposition comprising the post-registration correction factors.

35. The method of claim 34, wherein the set of post-registration correction terms is determined from principle component analysis of the variations among the registered values of the registered images at the selected points of the second array.

36. The method of claim 34, wherein the first and second arrays are identical to one another.

37. An image processing system comprising:
an input port for receiving a series of images;
a data storage device, operably coupled with the input port, for storing the images; and
a processor, operably coupled with input port and data storage device, for registering the images with a registration algorithm, wherein the processor performs the method of claim 34.

38. An apparatus comprising a computer readable medium storing a program that causes a processor to perform the method of claim 34.

* * * * *